(12) United States Patent
Benson

(10) Patent No.: US 8,043,767 B2
(45) Date of Patent: Oct. 25, 2011

(54) MULTI-LAYER FUEL CELL DIFFUSER

(75) Inventor: Paul Alan Benson, Leicestershire (GB)

(73) Assignee: Intelligent Energy Limited, Leicestershire (GB)

( * ) Notice: Subject to any disclaimer, the term of this patent is extended or adjusted under 35 U.S.C. 154(b) by 0 days.

(21) Appl. No.: 11/814,492

(22) PCT Filed: Jan. 11, 2006

(86) PCT No.: PCT/GB2006/000074
§ 371 (c)(1),
(2), (4) Date: Nov. 27, 2007

(87) PCT Pub. No.: WO2006/079781
PCT Pub. Date: Aug. 3, 2006

(65) Prior Publication Data
US 2008/0145738 A1    Jun. 19, 2008

(30) Foreign Application Priority Data
Jan. 26, 2005 (GB) .................................. 0501598.7

(51) Int. Cl.
*H01M 8/04* (2006.01)
*H01M 8/10* (2006.01)
*H01M 4/86* (2006.01)

(52) U.S. Cl. .......................... 429/514; 429/481; 429/483

(58) Field of Classification Search ................ 429/34, 429/12, 13, 19, 28, 40, 44, 42, 32, 450, 514, 429/481, 483; 204/884
See application file for complete search history.

(56) References Cited

U.S. PATENT DOCUMENTS 5,865,968 A * 2/1999 Denton et al. ................. 204/284
5,952,119 A   9/1999 Wilson
6,183,898 B1  2/2001 Koschany et al.
(Continued)

FOREIGN PATENT DOCUMENTS

EP    09 28 036    7/1999
(Continued)

OTHER PUBLICATIONS

"TGP-H Carbon Fiber Paper", Toray Industries Inc., retrieved online on May 21, 2010 from http://www.toray-auto.us/products/carbon_papers_fuel_cells.html.*
Search Report from corresponding GB Application No. GB0501598.7, mailed Feb. 23, 2006, 1 page.
International Preliminary Report on Patentability for Application No. PCT/GB2006/000074.
(Continued)

*Primary Examiner* — Jonathan Crepeau
*Assistant Examiner* — Kenneth Douyette
(74) *Attorney, Agent, or Firm* — Fish & Richardson P.C.

(57) ABSTRACT

An electrochemical fuel cell includes a membrane-electrode assembly (MEA) having a cathode face and an anode face. The MEA is between a cathode fluid flow field plate and an anode fluid flow field plate. A diffusion structure is between the MEA and a corresponding fluid flow field plate, which is either the cathode fluid flow field plate or the anode fluid flow field plate. The diffusion structure has a first face in contact with, or adjacent to, the MEA and a second face in contact with, or adjacent to, the corresponding fluid flow field plate. The diffusion structure includes a first layer having a first level of hydrophobicity and a second layer that is hydrophilic. The second layer is adjacent to the corresponding fluid flow field plate, and includes a hydrophilic binder material.

13 Claims, 3 Drawing Sheets

U.S. PATENT DOCUMENTS

| | | | |
|---|---|---|---|
| 6,291,093 | B1 * | 9/2001 | Kindler et al. ............... 429/34 |
| 6,350,539 | B1 * | 2/2002 | Wood et al. ............... 429/34 |
| 6,451,470 | B1 | 9/2002 | Koschany et al. |
| 6,605,381 | B1 | 8/2003 | Rosenmayer |
| 7,435,501 | B2 | 10/2008 | Peace et al. |
| 7,498,094 | B2 | 3/2009 | Hood et al. |
| 2004/0197629 | A1 | 10/2004 | Arishima et al. |
| 2004/0241531 | A1 | 12/2004 | Biegert et al. |
| 2005/0048351 | A1 | 3/2005 | Hood et al. |
| 2005/0106445 | A1 | 5/2005 | Mitchell et al. |
| 2005/0158593 | A1 | 7/2005 | Minehisa et al. |
| 2005/0202304 | A1 | 9/2005 | Peace et al. |
| 2005/0255373 | A1 * | 11/2005 | Kimura et al. ............... 429/44 |
| 2006/0257699 | A1 | 11/2006 | Hood et al. |
| 2006/0292429 | A1 | 12/2006 | Baird et al. |
| 2007/0166596 | A1 | 7/2007 | Benson |
| 2008/0248336 | A1 | 10/2008 | Matcham et al. |
| 2008/0314660 | A1 | 12/2008 | Davies et al. |
| 2009/0029231 | A1 | 1/2009 | Hood et al. |

FOREIGN PATENT DOCUMENTS

| | | | |
|---|---|---|---|
| JP | 2003-331850 | | 11/2003 |
| JP | 2004 039416 | | 2/2004 |
| JP | 2004-241363 | | 8/2004 |
| JP | 2004-247294 | | 9/2004 |
| WO | WO97/13287 | | 4/1997 |
| WO | WO 02/27846 | * | 4/2002 |
| WO | WO03/038924 | | 5/2003 |
| WO | WO 2004006364 | * | 1/2004 |
| WO | WO 2004/066427 | | 8/2004 |

OTHER PUBLICATIONS

Search Report for PCT/GB2006/000074.
Written Opinion for PCT/GB2006/00074.
Reply to Written Opinion in corresponding Application No. 06701351.6, dated Oct. 19, 2007.
Examination Report in corresponding Application No. 06701351.6, dated Mar. 23, 2009.
Amendment / Reply to Examination Report in corresponding Application No. 06701351.6, dated Jul. 20, 2009.
Translation of examination report dated Apr. 1, 2009 for corresponding application JP 2007-551731.
Translation of examination report dated Oct. 28, 2009 for corresponding application JP 2007-551731.
Translation of examination report dated Feb. 10, 2009 for corresponding application RU 2007132073.
Examination report and translation dated Mar. 6, 2009 for corresponding application CN20060003163.9.
Examination report dated Apr. 1, 2009 for corresponding application JP 2007-551731 (along with English-language version).
Examination report dated Oct. 28, 2009 for corresponding application JP 2007-551731 (along with English-language version).
Examination report dated Feb. 10, 2009 for corresponding application RU 2007132073 (along with English-language version).

* cited by examiner

MULTI-LAYER FUEL CELL DIFFUSER

The present invention relates to fuel cells and in particular to proton-exchange membrane type fuel cells in which hydrogen is supplied to the anode side of the fuel cell, oxygen is supplied to the cathode side of the fuel cell and water byproduct is produced at and removed from the cathode side of the fuel cell.

Such fuel cells comprise a proton exchange membrane (PEM) sandwiched between two porous electrodes, together comprising a membrane-electrode assembly (MEA). The MEA itself is conventionally sandwiched between: (i) a cathode diffusion structure having a first face adjacent to the cathode face of the MEA and (ii) an anode diffusion structure having a first face adjacent the anode face of the MEA. The second face of the anode diffusion structure contacts an anode fluid flow field plate for current collection and for distributing hydrogen to the second face of the anode diffusion structure. The second face of the cathode diffusion structure contacts a cathode fluid flow field plate for current collection, for distributing oxygen to the second face of the cathode diffusion structure, and for extracting excess water from the MEA. The anode and cathode fluid flow field plates conventionally each comprise a rigid, electrically conductive material having fluid flow channels in the surface adjacent the respective diffusion structure for delivery of the fuel gases (e.g. hydrogen and oxygen) and removal of the exhaust gases (e.g. unused oxygen and water vapour).

An important consideration in the operation of such fuel cells is the management of water within the MEA. During operation of a PEM fuel cell, product water from the reaction between hydrogen and oxygen is formed at catalytic sites of the MEA. This water must be exhausted from the MEA via the cathode diffusion structure at the same time that oxygen is transported to the cathode face of the MEA. However, it is also important that the MEA remains suitably hydrated to ensure that the internal electrical resistance of the cell remains within tolerable limits. Failure to control the MEA humidification leads to hot spots and potential cell failure and/or poor electrical cell performance.

The prior art has recognised a number of ways of improving the action of the diffusion structures.

For example, U.S. Pat. No. 6,605,381 teaches a diffusion structure between a fluid flow field plate and the MEA surface, the diffusion structure having a gradient in gas permeability in the direction perpendicular to the MEA. The diffusion structure comprises a laminated or continuously variable medium with higher gas permeability closer to the MEA than at the fluid flow field plate. In this way, water balance at the MEA is maintained more uniform across the area of the MEA.

In another example, U.S. Pat. No. 6,350,539 teaches a multi-layer cathode diffusion structure between a fluid flow field plate and the MEA surface in which the diffusion structure has: (i) an absorption layer adjacent to the MEA of relatively low hydrophobicity to encourage absorption of water from the MBA, (ii) a bulk layer of intermediate hydrophobicity and (iii) a desorption layer of relatively high hydrophobicity adjacent to the fluid flow field plate to encourage desorption of water from the diffusion structure into the fluid flow field plate. In this way, water transfer from the MBA to the exhaust is encouraged.

Ser. NO. WO 03/038924 describes a diffusion structure having porosity which varies as a function of certain trigger conditions such as temperature. In this way, the development of a hot spot in the cell from non-uniform distribution of fuel and/or water in the cell triggers a change in porosity acting against the change.

U.S. Pat. No. 6,451,470 describes a diffusion structure in which a layer of the diffusion material is provided with a filling material through a part of its thickness that inhibits the diffusion constant of water through the structure while maintaining a sufficient diffusion constant for oxygen, thereby ensuring an adequate supply of reactant oxygen at the same time as presenting over-transport of water from the MEA.

The prior art generally proposes the use of hydrophobic diffusion media or, in the case of US '539, variable hydrophobicity with a high hydrophobicity at least the interface with the cathode fluid flow field plate to encourage desorption into the fluid flow channels.

Thus, most porous carbon fuel cell diffusion materials are treated with PTFE or a similar hydrophobic substance to enhance the removal of water from the catalyst layer of the electrode. However, the inventors have found that this actually encourages the formation of large water droplets in the diffusion material adjacent or near to the cathode fluid flow field plate. The formation of large droplets of product water in or adjacent to the cathode fluid flow channels can be detrimental to the performance of the fuel cell.

In the case of 'closed' cathode fuel cells, the cathode fluid flow field plates are not open to ambient air and the pressure drop between the compressed air or oxygen inlet and the exit (exhaust) will be significantly raised by the presence of water droplets, resulting in higher associated parasitic energy losses for the system. In the case of 'open' cathode fuel cells, the cathode fluid flow field plates are open to ambient air, usually assisted by a low pressure air source such as an axial or centrifugal fan which provides the dual function of stack cooling and oxygen supply. In this configuration, formation of water droplets in the cathode diffusion structure and fluid flow plate channels may eventually result in a complete blockage of the channels with oxygen transport being restricted to the adjacent electrode areas.

Another problem associated with diffusion structures results from the very high compaction loads applied to the layers of the fuel cell when forming a fuel cell stack comprising a plurality of serially connected cells. In order to ensure good physical and electrical contact between the MEA layers, the diffusion structures and the fluid flow field plates, and to assure good gas-tight seals with associated gaskets and sealing rings, the various layers of a fuel cell stack are compressed together under high load. As a consequence, distinct areas of compression of the diffusion structure are concentrated in the region of the 'lands' or 'ribs' between channels in the surface of the cathode fluid flow field plates. This localised compression has been found to locally degrade the diffusion coefficient of the diffusion structure between channels thereby comprising the ability to ensure adequate water diffusion to the channels in the fluid flow field plate.

It is an object of the present invention to provide an improved diffusion structure that overcomes some or all of the problems with prior art diffusion structures.

According to one aspect, the present invention provides an electrochemical fuel cell comprising:

a membrane-electrode assembly (MEA) having a cathode face and an anode face being disposed between a cathode fluid flow field plate and an anode fluid flow field plate, each fluid flow field plate having fluid distribution conduits in a first surface thereof facing the respective cathode face or anode face of the MEA; and a diffusion structure disposed between the MEA and a respective one of the fluid flow field plates and having a first face in contact with or adjacent to the MEA and a second face in contact with or adjacent to the respective fluid flow field plate, the diffusion structure comprising a first layer having a first level of hydrophobicity and a second layer being relatively hydrophilic compared to the first layer, the second layer being adjacent to the respective fluid flow field plate.

According to another aspect, the present invention provides an electrochemical fuel cell comprising:

a membrane-electrode assembly (MEA) having a cathode face and an anode surface being disposed between a cathode fluid flow field plate and an anode fluid flow field plate, each fluid flow field plate having fluid distribution conduits in a first face-thereof facing the respective cathode face or anode face of the MEA; and a diffusion structure disposed between the MEA and a respective one of the fluid flow field plates and having a first face in contact with the MEA and a second face in contact with the respective fluid flow field plate, the diffusion structure comprising a first layer adjacent the respective fluid flow field plate and a second layer, the first layer having a relatively higher permeability than the second layer, the second layer being a support layer having a stiffness greater than that of the first layer.

Embodiments of the present invention will now be described by way of example and with reference to the accompanying drawings in which.

Figure 1:
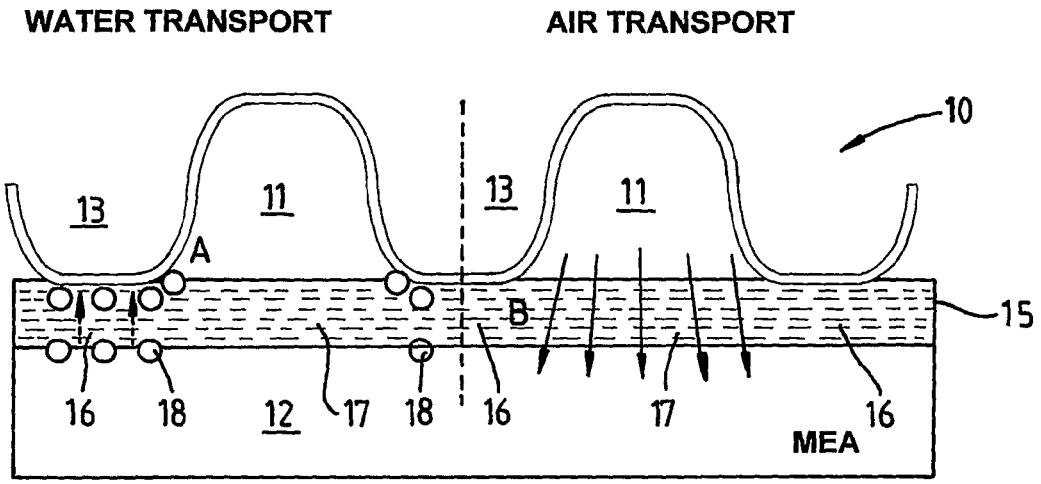
FIG. 1 is a schematic cross-sectional view of a portion of a fuel cell having a single layer diffusion structure.

FIG. 1 illustrates a cross-sectional view of part of the cathode side of a fuel cell, including a fluid flow field plate 10 incorporating a plurality of fluid flow channels or conduits 11 for delivery of oxidant to, and extraction of water from, an MEA 12 via a diffusion structure 15. The diffusion structure must be sufficiently porous and permeable to ensure adequate transport of oxygen from the channels 11 of the fluid flow field plate 10 to the MEA 12, and to ensure adequate transport of water from the MEA 12 to the channels 11 of the fluid flow field plate 10. At the same time, the water transport must not be so effective that the MEA 12 is allowed to dry out. Further, the transport of fluids to and from the MEA 12 should ideally be effective across the entire surface area of the MEA 12.

A number of problems with existing diffusion structures 15 have been identified. As mentioned earlier, high compression loads applied to the fuel cell stack result in undesirable compression of the diffusion structure 15 in the vicinity of the ribs 13 of the fluid flow plate 10 between the channels 11. This compression of the diffusion structure 15 results in reduced diffusion coefficient for water and/or oxygen in the compressed or compacted portions 16 and therefore relatively higher diffusion coefficient in the relatives) uncompressed regions 17. It will therefore be recognised that this can result in irregular hydration of the MEA 12 and irregular gas transport conditions across the surface of the MEA such that performance is compromised or at least not optimised over the entire surface.

In practice, it is found that during stack operation, the areas of MEA 12 directly adjacent to conduits 11 are dry and only the areas below ribs 13 contain sufficient levels of water. If attempts are made to ensure adequate levels of hydration of the MEA 12 in the vicinity of the relatively uncompressed regions 17, e.g. by reducing the diffusion coefficient of the diffusion structure 15, it is then found that excess water 18 accumulates in the vicinity of the compacted portions 16. This leads to water droplet formation and flooding, which can eventually block the cathode fluid flow field plate channels 11. This has serious consequences for the operation of the fuel cell, e.g. requiring shut-down and dehumidification of the stack with consequent loss of power.

Figure 2:
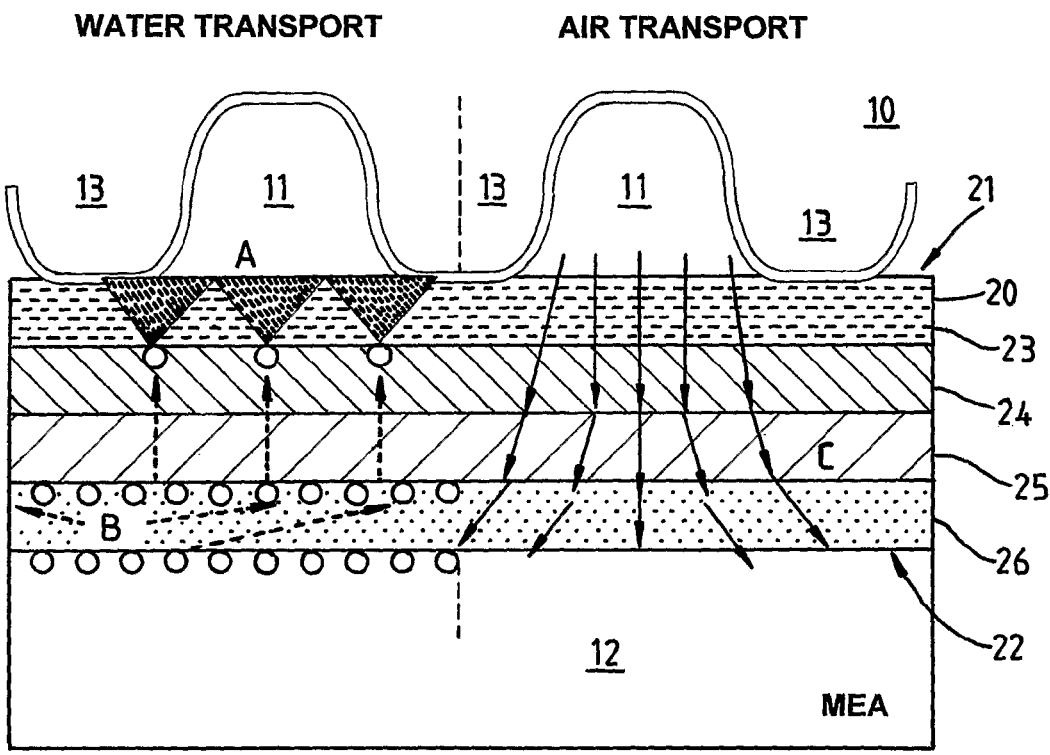
FIG. 2 is a schematic cross-sectional view of a portion of a fuel cell having a multi-layer diffusion structure.

With reference to FIG. 2, a multilayer diffusion structure 20 is used to provide a number of advantageous features. In this preferred embodiment, the diffusion structure 20 comprises a four layer structure, the layers having differing properties. The diffusion structure 20 has a first face 21 that is in contact with or adjacent to the fluid flow field plate 10 and a second face 22 that is in contact with or adjacent to the MEA 12. The diffusion structure 20 generally comprises layers of carbon fibre material having different levels of porosity and different diffusion coefficients, as well as different other physical properties as will be described.

A first layer 23 comprises a hydroplilic diffuser layer, e.g. a porous carbon layer which has been treated with a polyvinyl acetate or other hydrophilic binder material. An example of a suitable material for the first layer 23 is 'Technimat 050' as supplied by Lydall Filtration/Separation, Lydall, Inc. The first layer 23 (also referred to herein as the 'hydroplilic layer') preferably has a high permeability.

In a preferred embodiment, the first layer 23 has a thickness in the range 150 microns to 500 microns, and a low hydrophobicity. For optimum performance, the first layer 23 includes a hydrophilic binder content between 2 and 10 wt %.

In other materials, the hydrophilic material may be applied to the diffusion structure surface 21 as an emulsion to form the first layer 23.

A second layer 24 preferably comprises a much stiffer carbon fibre paper layer which provides a structural support to the first layer 23, and generally has a lower permeability. An example of a suitable material is 'Toray, 120' as supplied by Toray Industries, Inc. The second layer 24 (also referred to herein as the 'structural layer') is found to reduce the compression or compaction of other layers in the diffusion structure 20 by providing a relatively stiff layer within the diffusion structure to resist distortion. The second layer 24 results in increased diffusion of air or oxygen to contact areas aligned with the ribs 13 thereby reducing water accumulation.

In a preferred embodiment, the second layer 24 has a thickness in the range 200 microns to 400 microns and a hydrophobicity preferably significantly greater than that of the first layer. Preferably, for optimum performance, the second layer 24 has a hydrophobic treatment by weight in the range 0 to 20 wt %.

A third layer 25 preferably comprises a carbon paper layer having a lower permeability than adjacent layers, lower pore volume and generally a greater resistance to liquid water dispersal. In this layer, the water is encouraged to travel in an in-plane or 'lateral' direction, and localised compression of the third layer 25 by the ribs 13 is significantly resisted by the second layer 24. An example of suitable material for the third layer is 'SGL30BA' as supplied by SGL Technologies, SGL Carbon AG.

In a preferred embodiment, the third layer 25 has a thickness in the range 150 microns to 350 microns, and a hydrophobicity preferably significantly greater than that of the first layer 23. Preferably, for optimum performance, the third layer 25 has a hydrophobic treatment by weight in the range 0 to 30 wt %.

A fourth layer 26 preferably comprises a carbon paper layer having a slightly higher permeability than the third layer and incorporates a microdiffuser structure in the form of a pre-treatment with electrically conductive particles (such as carbon powder) and structural binder (such as PTPE) in order to fill pores and provide a better electrical contact to the adjacent MEA and smaller pore size. An example of suitable material for the fourth layer (also referred to herein as the 'microdiffuser layer') is 'SGL10BB' supplied by SGL Technologies, SGL Carbon AG.

In a preferred embodiment, the fourth layer 26 has a thickness in the range 200 microns to 450 microns, and a hydrophobicity preferably significantly greater than that of the first layer 23. Preferably, for optimum performance, the fourth layer 26 has a hydrophobic treatment by weight in the range 10 to 30 wt %.

The fourth layer 26 provides the second face 22 that is in contact with or adjacent to the MEA 12 as shown in FIG. 2.

Contrary to the teaching of the prior art discussed above, it has been found that the provision of a hydrophilic layer 23 immediately adjacent to or in contact with the fluid flow field plate 10 acts as an additional gas diffuser layer which discourages water droplets from forming. The prior art proposes the use of hydrophobic layers adjacent to the fluid flow plates in order to encourage desorption. In fact, the inventors have found that a relatively hydrophilic layer 23 encourages the spread of liquid water, produced from the fuel cell reaction, over a larger area. This encourages a much more effective removal of the water by the bulk air flow than is obtained when using only a hydrophobic diffuser. In addition, the build-up of rater under ribs 13 (i.e. in regions 16) is discouraged, reducing the effects of 'electrode flooding'. This allows operation of a fuel cell stack at a higher current and at much lower ambient temperature conditions.

The hydrophilic layer 23 can be created by using a diffuser substrate material pre-formed with a hydrophilic 'binder' material, or a carbon fibre material given a separate hydrophilic treatment.

The structural layer 24 effectively spreads compaction load. A carbon fibre material may be used that has a biaxial in-plane stiffness, i.e. greater resistance to bending along one in-plane axis than resistance to bending along a second in-plane axis orthogonal to the first. Where such a biaxial material is used, the axis of highest bending resistance is preferably disposed transverse to, and more preferably orthogonal to, the predominant direction of flow channels 11 so that maximum resistance to bending across the ribs 13 is achieved.

Characteristics of the above multilayer diffusion structure have been shown to be superior to more conventional diffusion structures in terms of increased MEA water content during operation without cathode flooding, and an increased spread of compaction load.

Figure 3A:
FIG. 3 shows a comparison of film impressions from an extensometer test, with FIG. 3a showing the result for a single layer diffuser structure and FIG. 3b showing the result for a multilayer diffuser structure.
Figure 3B:
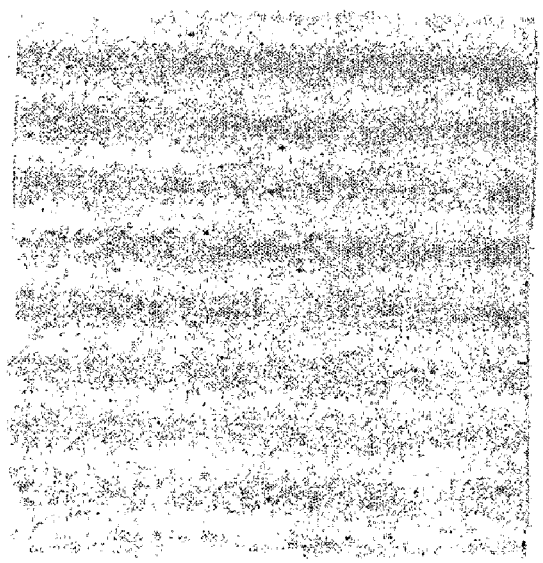

With reference to FIG. 3, a single layer carbon diffusion structure 15 formed from a commercially available woven cloth diffuser is compared with a three layer diffuser structure comprising the second, third and fourth layers discussed above in connection with FIG. 2. FIG. 3(a) shows a film impression from an extensometer after compression at 4000 N showing clear compaction of the single layer structure 15. FIG. 3(b) shows a corresponding film impression of the three layer diffuser structure 24, 25, 26 using a structural layer 24 as defined above for the second layer.

The spreading of compaction load also results in a more even intimate contact between the MEA 12 and the microdiffuser layer (fourth layer 26) resulting in improved current distribution and lower incidence of hot spots.

The use of the hydrophilic first layer 23 in the diffusion structure 20 means that water droplets 18 are discouraged from forming. This is illustrated as mechanism 'A' in FIG. 2. This is in comparison with the hydrophobic diffusion structures used in the prior art. The effect of the hydrophilic layer 23 adjacent to the fluid flow field plate 10 is to increase the 'evaporation area' for product water by the flow of air. This allows higher current operation and lower operating temperature with a much reduced risk of cathode flooding.

The SGL30 third layer 25 has a lower pore volume than the SGL10 fourth layer 26 and is therefore more resistive to liquid water dispersal. Hence, water is encouraged to travel in a lateral (i.e. in-plane) direction through the fourth layer 26 and will begin to diffuse upwards through the third layer 25 only when there is a high water content in the fourth layer 26. This is illustrated in FIG. 2 as mechanism 'B'. The effect of this is to keep the MEA 12 better humidified. This has been confirmed by obtaining 'non-looped' polarisation curves where the potential values on the upwards current sweep closely match those on the downwards current sweep.

Figure 4:
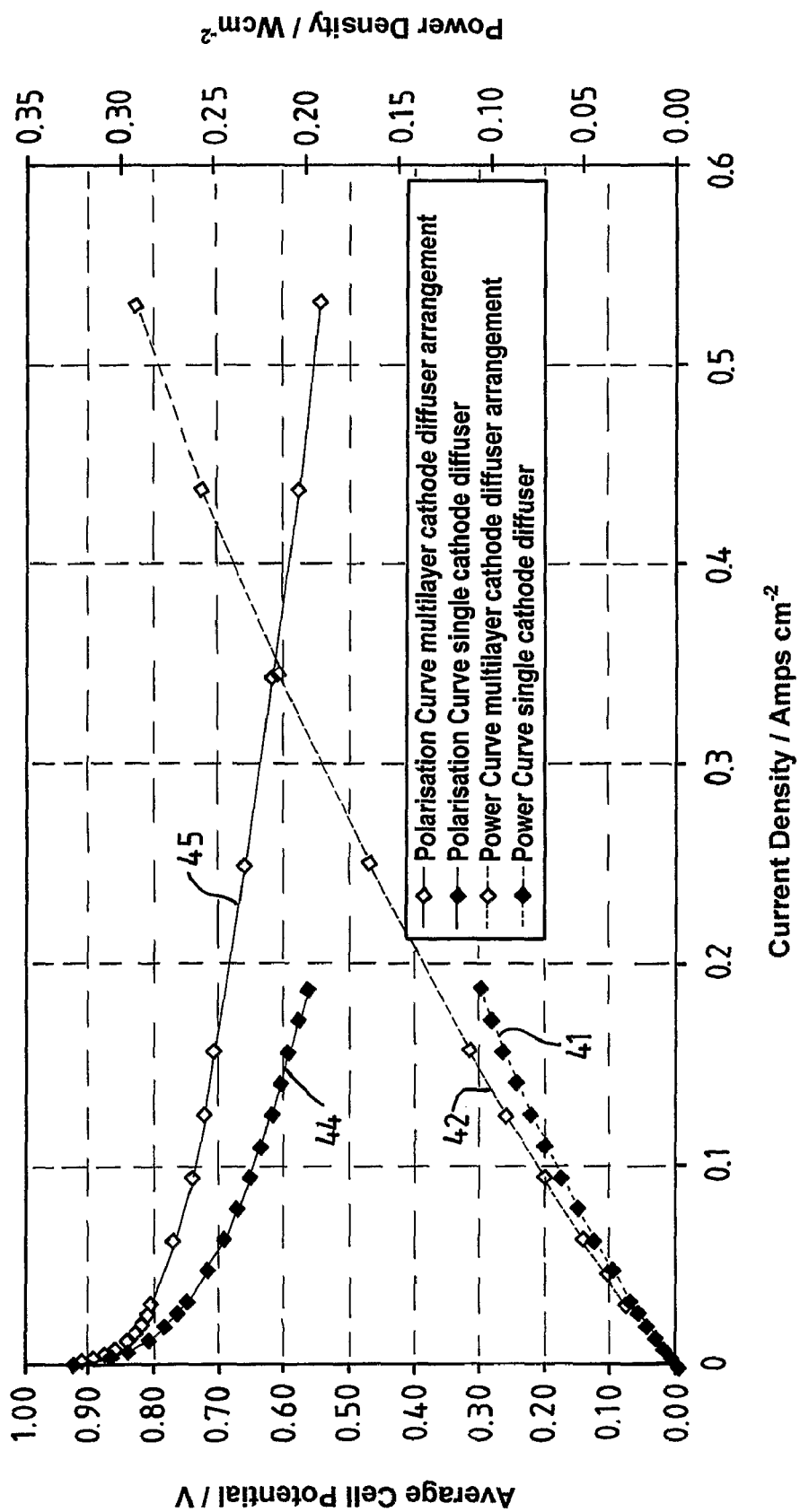
FIG. 4 shows polarisation and power characteristics of fuel cell stacks constructed with single layer diffusion structure and multilayer diffusion structures for comparison.

The effects of the multilayer diffuser structure 20 as described above are shown in FIG. 4 which illustrates average cell potential and power density as a function of current density for various diffuser structures 15, 20. Curves 41 and 42 represent the power density as a function of current density, while curves 44 and 45 represent polarisation as a function of current density. Curve 41 represents a single layer diffusion structure 15 while curve 42 represents the multilayer structure 20 of FIG. 2 with hydrophilic layer 23 and structural layer 24. Curve 44 represents a single layer diffusion structure 15 while curve 45 represents the multilayer diffusion structure 20 of FIG. 2 with hydrophilic layer 23 and structural layer 24.

The multi-layered diffusion structure 20 has an improved response to a large upwards shifts in load from open circuit. This is due to a 'water trap' effect of the multilayer arrangement where, during non-operational periods, there is a reduced natural removal of moisture from the membrane via the multilayer diffusion structure 20. When using single layer diffuser structures 15, greater loss of moisture from the MEA 12 occurs during cell idle periods. If an immediate high power is required from open circuit conditions, it is conventionally necessary to gradually increase stack current in order to allow the membrane to gradually humidify, to avoid cell damage. The multilayer diffuser structure 20 helps retain moisture in the MEA during non-use of the cells.

This "water-trap" tendency may also result in a greater degree of back diffusion from cathode to anode. This helps balance the water gradient across the membrane and thus thicker and more durable membrane structures can be used without a significant performance penalty. To the extent that that this adversely impacts the anode performance, it may be compensated for by providing a slightly higher PTFE content in the anode diffusion structure.

In some embodiments, the multilayer diffusion structure 20 may increase the bulk volume of each cell slightly, but this is compensated for by overall increases in the gravimetric and volumetric power stack densities.

The beneficial effects of the multilayer diffusion structure 20 as described above are particularly evident in the cathode side of the fuel cell where water content control is generally a more significant factor. However, the principles are also applicable to the anode side of the fuel cell where humidification is also important and where compaction is also significant. Thus, the multilayer structure 20 may be used in one or both of the anode and cathode sides of the fuel cell.

The separate benefits of the hydrophilic layer 23 and the structural layer 24 may be obtained alone or in combination with one another in a diffuser structure 20 although the best improvements are noted with the combined use of hydroplilic layer 23 and structural layer 24.

The functions of the hydrophilic layer 23 and the structural layer 24 malt also be combined in a single layer by treating the structural layer 24 with a hydrophilic surface emulsion or similar structure treatment.

Other embodiments are intentionally within the scope of the accompanying claims.

The invention claimed is:

1. An electrochemical fuel cell comprising:
a membrane-electrode assembly (MEA) having a cathode face and an anode face,
   the MEA being between a cathode fluid flow field plate and an anode fluid flow field plate,
   the cathode fluid flow field plate having fluid distribution conduits in a first surface thereof facing the cathode face,
   the anode fluid flow field plate having fluid distribution conduits in a first surface thereof facing the anode face; and
a diffusion structure between the MEA and a corresponding fluid flow field plate, the corresponding fluid flow field plate being the cathode fluid flow field plate or the anode fluid flow field plate,
   the diffusion structure having a first face in contact with the MEA and a second face in contact with the-corresponding fluid flow field plate,
   the diffusion structure comprising a hydrophilic layer, a structural layer, and a resistance layer,
   the hydrophilic layer being adjacent to the corresponding fluid flow field plate, the structural layer being adjacent to the hydrophilic layer, and the resistance layer being adjacent to the structural layer,
   the hydrophilic layer having a higher permeability than the structural layer,
   the structural layer being a support layer having a stiffness that is greater than a stiffness of the hydrophilic layer, and
   the resistance layer having a lower permeability than the structural layer, a lower pore volume than the structural layer, and a greater resistance to liquid water dispersal than the structural layer.

2. The fuel cell of claim 1, wherein the resistance layer has a level of hydrophobicity, and wherein the hydrophilic layer is more hydrophilic than the resistance layer.

3. The fuel cell of claim 2, wherein the hydrophilic layer comprises a portion of the diffusion structure treated with a hydrophilic surface emulsion.

4. The fuel cell of claim 3, wherein the diffusion structure comprises a carbon paper, and the hydrophilic layer comprises the carbon paper impregnated with polyvinyl acetate.

5. The fuel cell of claim 2, wherein the structural layer has a stiffness that is greater than a stiffness of the resistance layer.

6. The fuel cell of claim 5, wherein the diffusion structure comprises a microdiffuser layer that is between the resistance layer and the MEA, the microdiffuser layer comprising a portion of the diffusion structure treated with a mixture of electrically conductive particles and a structural binder.

7. The fuel cell of claim 1, wherein the diffusion structure is between the cathode face of the MEA and the cathode fluid flow field plate.

8. The fluid flow plate of claim 1, wherein the diffusion structure is between the anode face of the MEA and the anode fluid flow field plate.

9. The fuel cell of claim 1, wherein the support layer has biaxial in-plane stiffness, and wherein a direction of maximum stiffness traverses fluid distribution conduits in an adjacent fluid flow plate.

10. The fuel cell of claim 1, wherein the diffusion structure is between the anode face of the MEA and the anode fluid flow field plate.

11. The fuel cell of claim 1, wherein the diffusion structure is a first diffusion structure that is between the MEA and the cathode fluid flow field plate; and
   wherein the fuel cell further comprises a second diffusion structure, the second diffusion structure having a configuration that is identical to a configuration of the first diffusion structure, the second diffusion structure being between the MEA and the anode fluid flow field plate.

12. The fuel cell of claim 2 or 9, wherein the diffusion structure is a first diffusion structure that is between the MEA and the cathode fluid flow field plate; and
   wherein the fuel cell further comprises a second diffusion structure, the second diffusion structure having a configuration that is identical to a configuration of the first diffusion structure, the second diffusion structure being between the MEA and the anode fluid flow field plate.

13. The fuel cell of claim 1, wherein the hydrophilic layer is more hydrophilic than the structural layer.

* * * * *

UNITED STATES PATENT AND TRADEMARK OFFICE
CERTIFICATE OF CORRECTION

PATENT NO. : 8,043,767 B2  
APPLICATION NO. : 11/814492  
DATED : October 25, 2011  
INVENTOR(S) : Paul Alan Benson It is certified that error appears in the above-identified patent and that said Letters Patent is hereby corrected as shown below:

In the Claims

Column 7, Line 13, Claim 1:
delete "the-corresponding" and insert --the corresponding--, therefor.

Signed and Sealed this
Second Day of July, 2013

Teresa Stanek Rea
*Acting Director of the United States Patent and Trademark Office*